United States Patent
Lovmark

(10) Patent No.: US 7,396,027 B1
(45) Date of Patent: Jul. 8, 2008

(54) WHEELBARROW WITH SELF-BRAKING MECHANISM

(76) Inventor: August Otto Lovmark, 110 Lovmark Way, Sebastopol, CA (US) 95472

(*) Notice: Subject to any disclaimer, the term of this patent is extended or adjusted under 35 U.S.C. 154(b) by 0 days.

(21) Appl. No.: 11/550,405

(22) Filed: Oct. 17, 2006

Related U.S. Application Data

(60) Provisional application No. 60/727,234, filed on Oct. 17, 2005.

(51) Int. Cl.
B62B 3/08 (2006.01)
B62B 7/14 (2006.01)

(52) U.S. Cl. .................. 280/47.34; 280/47.41

(58) Field of Classification Search ........... 280/47.16, 280/47.17, 47.12, 47.24, 47.26, 47.3, 47.31, 280/62, 47.32, 47.33, 47.34, 47.41; 188/2 D, 188/2 R, 19, 21, 29, 119, 167, 169
See application file for complete search history.

(56) References Cited

U.S. PATENT DOCUMENTS

| | | | | |
|---|---|---|---|---|
| 736,697 A * | 8/1903 | Cummins | ................ | 280/43.24 |
| 931,096 A * | 8/1909 | Todd | ................ | 280/47.17 |
| 1,255,128 A * | 2/1918 | Bayley | ................ | 280/43.24 |
| 2,598,261 A * | 5/1952 | Hrabal | ................ | 280/47.17 |
| 2,716,031 A * | 8/1955 | Roessler | ................ | 280/47.31 |
| 4,767,128 A * | 8/1988 | Terhune | ................ | 280/47.2 |
| 4,789,171 A * | 12/1988 | Porter | ................ | 280/47.18 |
| 6,286,631 B1 * | 9/2001 | Kimble | ................ | 188/19 |
| 6,390,496 B1 * | 5/2002 | Eicher | ................ | 280/653 |
| 6,446,989 B1 * | 9/2002 | Intengan | ................ | 280/47.34 |
| 6,851,701 B2 * | 2/2005 | Tomchak et al. | ................ | 280/653 |
| 6,869,098 B2 * | 3/2005 | Tomchak et al. | ................ | 280/653 |
| 6,886,838 B1 * | 5/2005 | Zimmerman | ................ | 280/47.31 |
| 6,923,469 B2 * | 8/2005 | Tomchak et al. | ................ | 280/653 |
| 6,991,251 B2 * | 1/2006 | Tomchak et al. | ................ | 280/653 |
| 7,032,718 B1 * | 4/2006 | Lessard | ................ | 188/19 |
| D527,157 S * | 8/2006 | Boon | ................ | D34/16 |
| 2003/0141686 A1 * | 7/2003 | Willis | ................ | 280/47.34 |

* cited by examiner

Primary Examiner—Christopher P. Ellis
Assistant Examiner—Bridget Avery
(74) Attorney, Agent, or Firm—Gary Hoenig

(57) ABSTRACT

The self-braking wheelbarrow of the present invention comprises a wheelbarrow bin assembly mounted so as to pivot relative to an undercarriage assembly whereby the bin assembly interferes with the wheels on the undercarriage assembly causing a friction on the tread of the wheel and restricting the rotation of the wheel. In normal usage the undercarriage assembly is secured to the wheelbarrow bin assembly by securing latches. Braking is accomplished by selectively releasing securing latches, thereby permitting the wheelbarrow to pivot, and lifting the handles as if to move the wheelbarrow. The braking force applied to the tread on the wheel is proportional to the bin load thereby resulting in higher braking force with higher bin loads.

4 Claims, 3 Drawing Sheets

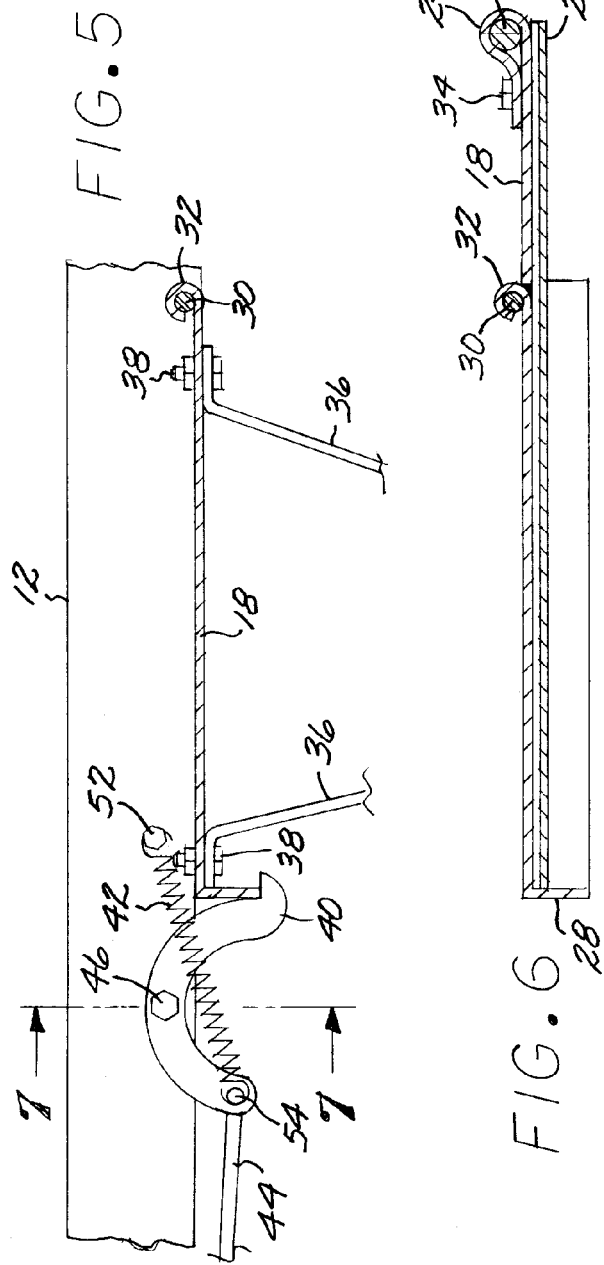

WHEELBARROW WITH SELF-BRAKING MECHANISM

This non-provisional application filed in the United States Patent and Trademark Office claims benefit of prior U.S. provisional application Ser. No. 60/727,234, filed Oct. 17, 2005.

BACKGROUND OF INVENTION

The present invention relates to wheelbarrows and, more particularly, to a wheelbarrow with a self braking mechanism.

Wheelbarrows are widely used in the construction industry to transport materials on a construction site. Unloading a wheelbarrow typically involves tipping the wheelbarrow forward to dump the load contents from the front of the wheelbarrow. On level surfaces, a difficulty experienced during dumping is the forward movement of the wheelbarrow experienced as the handles of the wheelbarrow are lifted to accomplish the dumping due to the forward force vector on the wheelbarrow as the handles are lifted. The operator must restrain the wheelbarrow from rolling forward. As a result, the operator may lose control of the wheelbarrow, whereupon the wheelbarrow continues to move forward instead of tipping, risking damage to property and injury to others nearby. Additionally, once the wheelbarrow contents are dumped, the wheelbarrow may become unstable as it rests on the single axle wheel whereupon the wheelbarrow may roll backward or forward further risking injury to the operator.

When dumping on a forward sloping surface, the forward roll problem becomes worse. Yet more challenging is dumping the load contents on a reverse sloping surface, whereupon the wheelbarrow tends to roll towards the operator during dumping. To restrain the wheelbarrow tendency to roll forward during dumping, the operator may use a chock placed in front of the wheel such as a piece of lumber.

Prior art attempts to prevent or reduce the motion of the wheelbarrow during dump have been proposed including applying a brake. Previously proposed brake systems have been inadequate and have presented problems principally related to manipulating the brake activation mechanism during dumping and fouling of complex mechanisms by construction site debris.

SUMMARY OF THE INVENTION

Accordingly, the present invention is directed to a wheelbarrows, and, more specifically, to a wheelbarrow incorporating a self-braking feature whereby the wheel or wheels of the wheelbarrow are restricted from rotating when securing latches are selectively released and the wheelbarrow handles are lifted as in a motion to move the wheelbarrow or to dump the load contents, thereby substantially obviating one or more of the problems due to the limitations and disadvantages of the related art.

In its essential form, the invention is a wheelbarrow bin assembly mounted so as to pivot relative to an undercarriage assembly whereby the bin assembly interferes with wheels of the undercarriage assembly when pivoted. The wheelbarrow bin assembly comprises a wheelbarrow style bin mounted to a pair of handles with a shim wedge between the handles and the bin with an axle mounted near the end of the handles and perpendicular to the handles. The undercarriage assembly comprises a base plate supporting a front wheel axle with wheels, a support stand and clips for gripping the wheelbarrow bin assembly axle. The base plate being substantially flat, having a front, rear, top and bottom, is engineered so as to support a wheel axle at the front of the plate and clips to retain the bin assembly axle and mounted on the base plate at a position as measured from the front axle and distance slightly greater than the radius of the wheels. The wheelbarrow bin assembly further comprises securing latches mounted to each handle to engage and lock the rear of the base plate assembly against the handles when the securing latches and base plate are in the locked position. The securing latches are selectively opened by means of a connecting rod attached to each securing latch and to a respective lever handle mounted near the operator end of each handle thereby facilitating the rotation of the securing latch around a fastener mounting the securing latch to the handle. A spring is mounted to each securing latch between the latch and the handle so as to force the securing latch to the locked position when not activated. With the rear of the base plate locked and held in position against the handles by the securing latches, the wheelbarrow is used as a conventional wheelbarrow.

When braking is required, the wheelbarrow handles are lowered such that the support stand rests on the ground thereby relieving pressure on the latches allowing the operator to selectively release the latches. The operator lifts the handles while releasing the securing latches by means of levers conveniently mounted on the wheelbarrow handles near the end of the handle; and pivoting the wheelbarrow bin assembly forward relative to the undercarriage assembly. As the wheelbarrow pivots, pressure is applied to the tread of the wheels by the front ends of the handles thereby interfering with the rotation of the wheel. The amount of force on the applied to the wheel is proportional to the load in the bin thereby assisting the self-braking effect. High bin loads deform the wheel more as the force of the pivoting increasing and results in the front of the bin to also interfere with the tread on the wheel thereby resulting in a greater self-braking effect. The braking force applied to the wheel is therefore not dependant on the force applied by the operator to a brake lever or, as in this invention, the handle levers.

BRIEF DESCRIPTION OF DRAWINGS

The accompanying drawings, which are incorporated in and constitute a part of this specification illustrate embodiments of the invention and, together with the description, serve to explain the features, advantages, and principles of the invention.

In the drawings:

FIG. 5 is a sectional view taken along Line 5-5 of FIG. 4 showing details of the securing latch locking the rear of the base plate in position against the handles and also showing the pivot axle and pivot axle mount of the base plate.

FIG. 6 is a sectional view of the wheelbarrow, according to the present invention taken along Line 6-6 of FIG. 4 showing details further details of the pivot axle mount and the wheel axle bracket of the base plate with the pivot axle and wheel axle in place.

FIG. 7 is a sectional view taken along Line 7-7 of FIG. 5 illustrating the securing latch mounting bolts fastening the latches to the handles with the rear of the base plate being locked against the handles by the latches.

DETAILED DESCRIPTION OF THE PREFERRED EMBODIMENT

Figure 1:
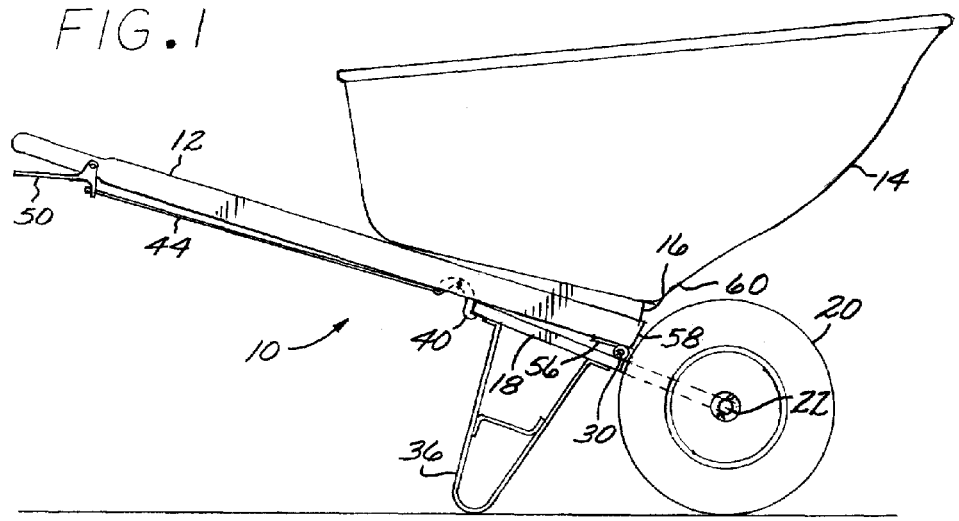
FIG. 1 is a side elevation view showing the wheelbarrow with the bin and handle assembly pivotally attached to the base plate near the wheels and locked by securing latches to the rear of the base plate according to the present invention.

Although particular embodiments of the invention have been described in detail for purposes of illustration, various modifications may be made without departing from the spirit and scope of the invention. Accordingly, the invention is not to be limited except as by the appended claims. Referring now in greater detail to the various figures of the drawings wherein like reference characters refer to like parts, there is shown at 10 in FIG. 1, a wheelbarrow with a self braking mechanism.

As shown in FIG. 1, the wheelbarrow with self-braking mechanism of this invention is a wheelbarrow bin assembly mounted so as to pivot relative to an undercarriage assembly whereby the bin assembly interferes with wheels of the undercarriage assembly when pivoted. The wheelbarrow bin assembly comprises a pair of elongate handles 12, having front and rear ends, mounted to the bottom of a wheelbarrow bin 14 mounted to a pair of handles 12 with a shim wedge 16 between the pair of handles 12 and the bin 14. Mounted near the front ends of the elongated handles 12 are a pair of aligned pivot axle brackets 56 which journal a pivot axle 30 on which is mounted wheels 20. The wheels 20 a preferably pneumatic type tires; however solid rubber or rubber-like material tires are suitable.

Figure 2:
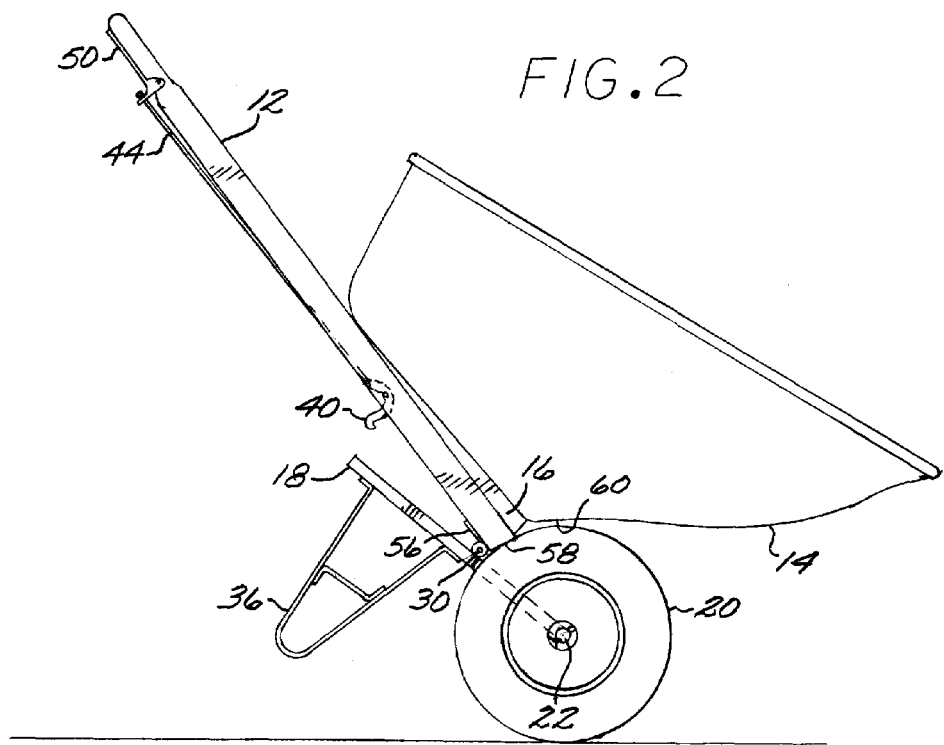
FIG. 2 is a side elevation view of the wheelbarrow of FIG. 1, according to the present invention, with the bin and handle assembly pivoting forward with the securing latches released from the rear of the base plate wherein the forward end of the handles bind against the wheels so as to brake the wheel.

Referring to FIG. 2, the undercarriage assembly is shown in an unsecured position wherein the base plate 18 is attached by means of the pivot axle 30 to the wheelbarrow bin assembly at a point near the front end of the handles 12. Note that the front end of the handles 12 extend forward from the pivot axle 30. When the wheelbarrow bin assembly is tilted forward by lifting the handles 12 when the base plate 18 is released, the handle and bin assembly rotates forward wherein the front ends of the handles 12 interfere with the tread of the wheels 20. The upward force applied near the rear end of the handles and the downward force of the bin and bin contents in a force applied by the ends of the handles 12 to interference point 58 along the circumference of the wheels 20. With increasing pressure of the end of the handle 12 against the wheel 20, the braking effect also increases thereby restricting the wheel 20 from rotating around wheel axle 22 and relative to the handle and bin assembly. Higher bin loads result in a greater forced applied by the ends of the handle to the wheel, thus further assisting the self-braking effect. The wheel 20 is compressed and deformed by the force at interference point 58. High bin loads also provide sufficient force to deform the wheel 20 such that the front outside surface of the bin 14 contacts the wheel 20 at a second interference point 60 to provide further friction with the wheel 20.

Figure 3:
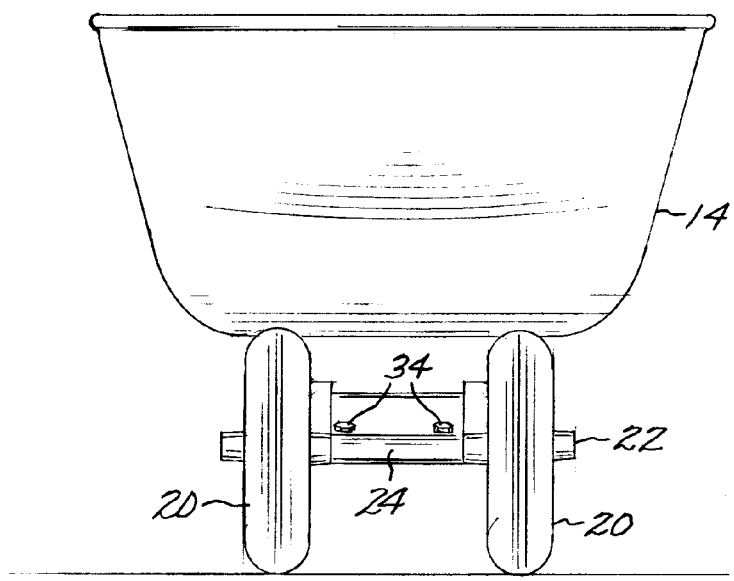
FIG. 3 is a front elevation view of the wheelbarrow of FIG. 1.
Figure 4:
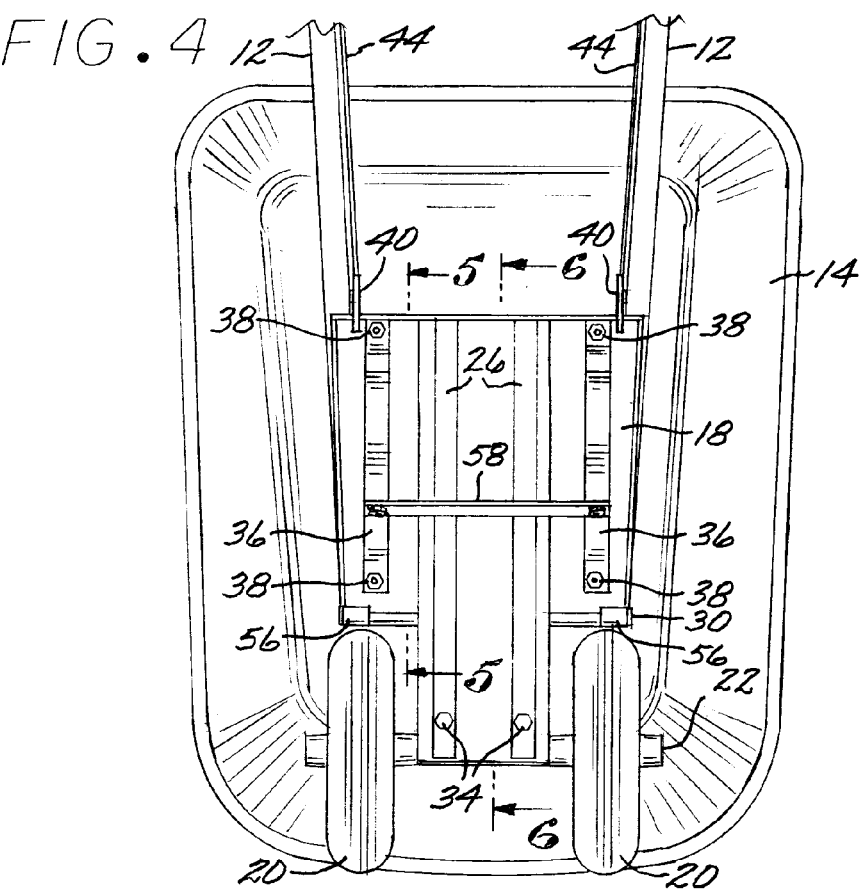
FIG. 4 is a bottom plan view of the wheelbarrow of FIG. 2.

As in FIGS. 3, the wheels 20 are positioned on the wheel axle 22 ends such that the center of the wheel tread is aligned with the center of the front end of the corresponding handle 12. In FIG. 4, cut out portions from the front of the base plate 18 permit the tread at the outside circumference of the wheels 20 to be positioned forward of the base plate 18, handle pivot axle retainer clips 56 and handle 12 ends. The wheelbarrow bin assembly thereby may pivot relative to the undercarriage assembly at pivot axle 30 when the securing latches 40 are released. A support stand, comprising a pair of vertical legs 36 with cross members 58, is mounted with bolt fasteners 38 to the bottom of the base plate 18 for supporting the rear of the base plate 18 and permitting the wheelbarrow to stand freely.

Securing latches 40, as shown in FIG. 5, are fashioned from flat metal to form a semicircular element have an expansion at the front end for grasping the rear portion of the base plate 18. The securing latch 40 is mounted by fastener 46 to the vertical side of handle 12 through a hole so as to rotate around the pivot fastener 46 at a centrally located hole in the securing latch 40. A pin 54 fixed at the rear end for attachment to a first end of spring 42 and the distal end of connecting rod 44. The second end of spring 42 is fixed to the handle 12 by fastener 52 forward of the securing latch pivot fastener 46 in a manner so as to provide force for the securing latch to return to position securing the base plate 18. A pulling action on the connecting rod 44 thereby results in the securing latch to move away from the base plate 18 and release the base plate 18 to pivot around pivot axle 30. Also illustrated in FIG. 5 is a portion of the vertical legs 36 of the support stand and support stand fasteners 38.

In FIG. 7, a cross sectional view taken along line 7-7 of FIG. 4, details of the mounting of the securing latches 40 to the handles 12 are shown. The securing latch pivot fasteners 46 are lag bolts in this embodiment as the handles 12 are constructed of wood. Spacer 48 is positioned between the securing latch 40 and the handle 12 to facilitate rotation and minimize wear on the handle. Although the handles 12 are constructed of wood in the preferred embodiment, other suitable materials may also be utilized.

Referring to FIG. 6, a cross sectional view taken along line 6-6 of FIG. 4, mounted on the front of the base plate 18 is wheel axle bracket 24 which journals the wheel axle 22 on which is mounted the pair of wheels 20. In this embodiment, the base plate 18 is formed from sheet metal, however other materials may be used, such as plastic. The edges of the base plate 18, typified at 28, are folded downwardly for additional strength thereby also presenting a rigid element for securing the rear of the base plate by the securing latches. Also illustrated in FIG. 6 is the stiffener element 26 welded to the bottom of the base plate 18 and positioned to run the length of the base plate 18 from front to rear.

Returning once again to FIG. 1, the handle lever 50 is fixed to handle 12 so as to rotate pulling the proximate end of the connecting rod 44 to which it is attached. In FIG. 1, the handle lever 50 is not activated and the base plate 18 is locked in position by the securing latches 40 adjacent to the handles 12. In this configuration, the wheelbarrow is maneuverable as conventional wheelbarrow and shown resting on the support stand 36. The handles 12 are fixed to the bottom of the bin 14 with a shim wedge 16 in between. On the bottom of the handles 12, near the front end of the handles are mounted the pivot axle brackets 56 that retain the pivot axle 30 which is also held by clips on the base plate 18 as previously described.

Now referring again to FIG. 2, showing the handle levers 50 activated with the securing latches therefore releasing the base plate 18, the wheelbarrow bin assembly rotates forward forcing the handle 12 ends into the tire tread of the wheels 20 at interference point 58. The resulting friction between the handle 12 end and restricts the wheel 20 from rotating around wheel axle 22 thereby causing a self-braking effect. Note also that shim wedge 16 positions the front outside surface portion of bin 14 so as not to interfere with the wheel 20 tread except when the bin 14 is heavily loaded and the securing latches 40 are released so as to bind at the second interference point 60.

What is claimed is:

1. A wheelbarrow with a self-braking mechanism comprising:
   a wheelbarrow style bin,
   a pair of elongate handles having a front, rear, top and bottom, attached to the bottom of the bin, a pair of aligned pivot axle brackets mounted to the bottom of the elongate handles near the front end of the handles, a pivot axle journaled by the pivot axle brackets, a base plate being substantially flat having a top, bottom, front and rear, a wheel axle bracket positioned at the front of the base plate, a wheel axle secured by the wheel axle bracket, a pair of wheels, having tread along the circumference, fixed to the ends of the wheel axle and positioned such that the front end of the handles is centered over the center of the tread of the wheel along the circumference of the wheel, a pivot axle retaining clip securing the pivot axle to the base plate being positioned parallel to the wheel axle and at a distance slightly greater than the radius of the wheels such that when the handles pivot relative to the base plate, the front ends of the handles interfere with the wheels, and at least one securing latch mounted to the elongate handles positioned so as to lock the rear of the base plate against the handles thereby preventing the base plate from pivoting relative to the handles.

2. The wheelbarrow with a self-braking mechanism of claim 1 further comprising a support stand having a pair of vertical elements supported by cross members and attached to the bottom of the base plate near the rear of the base plate.

3. The wheelbarrow with self-braking mechanism of claim 1 wherein the securing latch further comprises a spring having a first and second end with the first end attached to the securing latch and the second end attached to one of the handles so as to hold the securing latch in a closed position.

4. The wheelbarrow with self-braking mechanism of claim 3 further comprising;

a connecting rod having distal and proximate ends with the distal end attached to the securing latch, and a handle lever secured to the rear end of one of the handles and the proximate end of the connecting rod whereby the securing latch is activated by depressing the handle lever thereby releasing the base plate.

* * * * *